Sept. 1, 1959 R. H. BECK 2,901,770
EXTRUSION APPARATUS AND PROCESSES OF EXTRUDING
Filed May 6, 1955 2 Sheets-Sheet 1
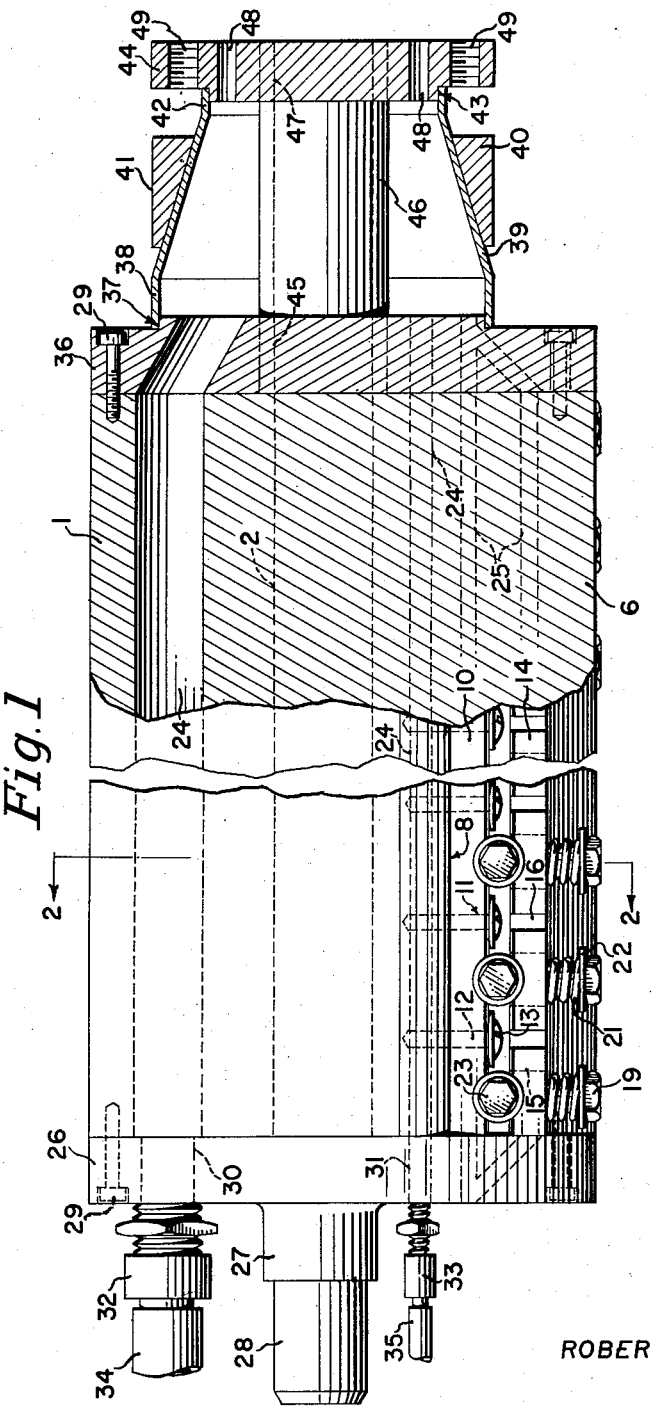
INVENTOR
ROBERT HAUN BECK
BY *Lynn Barratt Morris*
ATTORNEY Sept. 1, 1959 R. H. BECK 2,901,770
EXTRUSION APPARATUS AND PROCESSES OF EXTRUDING
Filed May 6, 1955 2 Sheets-Sheet 2
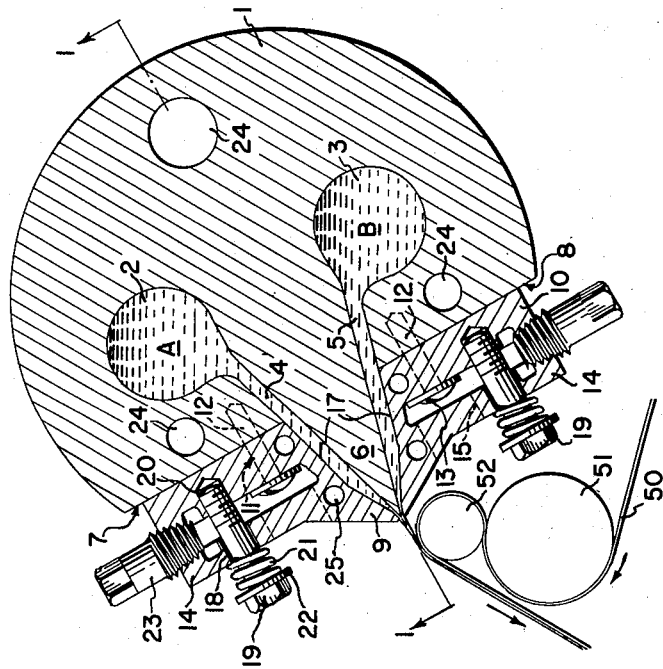
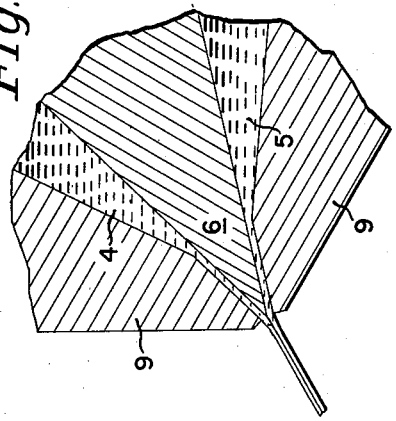
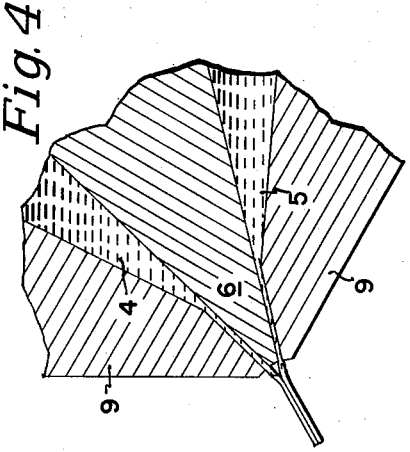
INVENTOR
ROBERT HAUN BECK
BY *Lynn Barratt Morris*
ATTORNEY

United States Patent Office

2,901,770
Patented Sept. 1, 1959

2,901,770

EXTRUSION APPARATUS AND PROCESSES OF EXTRUDING

Robert Haun Beck, Fair Haven, N.J., assignor to E. I. du Pont de Nemours and Company, Wilmington, Del., a corporation of Delaware Application May 6, 1955, Serial No. 506,458

11 Claims. (Cl. 18—13)

This invention relates to an extrusion hopper and more particularly to a dual extrusion hopper. Still more particularly it relates to an extrusion hopper for the simultaneous extrusion, in surface contact with each other, of two layers of viscous material. The invention also relates to a process for extruding, in surface contact with each other, of two thin wide layers of viscous material. It further relates to such a process wherein the layers are brought into surface contact at the extrusion orifice and the composite film is coated on the surface of a web, e.g., a continuous sheet of film or paper.

An object of this invention is to provide a new and useful extrusion hopper. Another object is to provide such a hopper which is useful in extruding very thin layers in surface contact as a composite film. A further object is to provide such a hopper which is simple in construction and gives uniform results. A still further object is to provide a dual extrusion hopper which can be readily assembled and adjusted to form a composite film from two separate thin layers. Yet another object is to provide a process for extruding simultaneously and in surface contact thin wide layers of viscous material. A related object is to provide such a process wherein the composite layer is applied onto the surface of a moving web. A still further object is to provide a process of coating on a moving web a composite film comprising a thin layer of viscous material and an extremely thin adjacent layer. A specific object is to provide a process for simultaneously forming a composite film comprising a silver halide emulsion layer and an extremely thin protective layer and coating the composite film on the surface of a moving web, e.g., a film base or sheet of paper. Still other objects will be apparent from the following description of the invention.

A practical embodiment of a dual extrusion apparatus of this invention will now be described with reference to the accompanying drawings which form a part of this specification, in which:

Fig. 1 is a side elevation of the extrusion hopper with one end in section taken along the line 1—1 of Fig. 2.

Fig. 2 is a vertical sectional view, with parts in elevation, of the hopper in position above a support roller, taken along the line 2—2 of Fig. 1, Fig. 3 is an enlarged vertical sectional view of one design of orifice lips, and Fig. 4 is an enlarged vertical sectional view of an alternative design of orifice lips.

In the various figures of the drawings, lilke reference numerals refer to like parts throughout the several views.

Referring now to the drawings, the extrusion hopper consists of an elongated body 1 having two spaced lengthwise channels 2 and 3, the bottom portions of which communicate with narrow lengthwise lateral passages 4 and 5, respectively. These passages have smooth straight inner walls which converge so that they meet at or in close proximity to the orifice lips forming a protruding lengthwise wedge-shaped tongue 6. The outer walls of the passages are shorter than the inner walls and terminate at the bottom surfaces 7 and 8, respectively, of body 1.

On each side of tongue 6 and detachably secured to the bottom surfaces 7 and 8 are lip members 9 which preferably are identical in construction but reversed in position. These lip members are U-shaped and the upper arm 10 of each has a flat upper surface which fits against the respective flat surface of the bottom of the body. The interfitting surfaces are carefully machined so that they will fit closely together. If desired, a suitable gasket (not shown) may be placed between the surfaces.

The upper arm 10 is provided with a plurality of holes 11 that preferably are in a straight row and uniformly spaced. Screws 12, which preferably are of smaller diameter than the holes, are threadably engaged with the bottom surface of body 1. These screws are shown as having a screw slot 13, but they may have a polygonal recess or polygonal head for the reception of a wrench or other tool. In lower arm 14, immediately beneath each screw head, is an opening 15 for the reception of a tool to adjust the screw. A lateral slot 16 extends from this opening to the outer edge of the opening. These slots divide the lower arm into segments. This construction is more fully shown in Velvel U.S. application Ser. No. 489,868 filed February 23, 1955 now U.S. Patent 2,765,492 granted October 9, 1956.

The central wall or base of the lip member has its outer surface 17 machined so that it will coact with the wedge portion 6 of body 1 and with the outer wall of the respective passage. This outer surface preferably slants for most of its length in the same direction as the outer surface of the wedge portion, but near its edge slants to a greater degree whereby the fluid passage between the surfaces converges so that at the bottom edge the adjacent surfaces are a small distance apart. The adjacent surfaces for a short distance near their outer edges are preferably parallel as more clearly shown in Figs. 3 and 4 in enlarged section.

The lower arm 14 of the lip member is provided with a plurality of holes 18 which are preferably in rows and uniformly spaced. Screws 19, which may be smaller in diameter than the holes, pass through the latter to threadably engage similarly spaced threaded holes 20 in the upper arm. Between the head of each screw and the outer surface of lower arm 14, there is a coil spring 21 and washer 22. The screws 19 are placed a substantial distance from the inner wall of the web of the lip member, which construction allows the lower arm as well as the bottom edge of the lip member to move or flex (within the elastic limits of the metal), thus admitting of a fine adjustment at the orifice defining edge.

The space between the inner surfaces of arms 10 and 14 constitutes a narrow slot. A plurality of tapered screws 23 are threadably engaged with arcuate portions on the inner surfaces of said arms. A vertical plane passing through the center of each screw and the coacting arcuate threaded portions of said arms, preferably, also passes through the center of screw 19. The head of each tapered screw is provided with a suitable means, e.g., a polygonal end, for the reception of a tool to adjust the tapered screw toward or away from the longitudinal axis of the extrusion orifice.

Each spring 21 insures that each segment of the lower arm between lateral slots 16 is always in contact with the tapered screw in the central part of such segment. The taper of the thread, the pitch of the thread and the lever ratio can be selected to give the desired mechanical advantage between screw rotation and lip movement. In a practical design, eleven adjusting screws having a nominal outside diameter of 0.5625 inch, a pitch and lead of 32 threads per inch and a taper of 0.375 inch per foot, one and three-eighths inches apart in a lip fourteen and three-fourths inches long provide local adjustment of about 0.004 inch (i.e., 0.002 inch each way from an original central position) of the lips between each section of the lower arm between the narrow slots. In an apparatus having the dimensions just recited, the outer surface of the central wall of the lip member preferably is parallel to the outer surface of the tongue, as more clearly shown in Figs. 3 and 4, for a distance of $\frac{1}{16}$ to $\frac{1}{2}$ inch.

In assembling the device, the orifice lips are fastened to the body member by first aligning the lips along an axis at approximately the spacing desired and then tightening the tapered screws 23. The width of the slot opening between the lips defined by the apex of wedge portion 6 and the lower edge of the base 17 of lip member 9 is measured in each segment between the lateral slots 16. Tapered screws 23 are then adjusted to correct for any deviations from a straight line.

Body member 1 is provided with longitudinal passages 24 for the circulation of a heat-exchange fluid. The lip members are also provided with longitudinal passages 25 for a similar purpose.

One end of the body member is provided with an endplate 26 which is provided with a lateral central hub 27 having a lateral stubshaft portion 28 which is journalled in a suitable bearing (not shown) in a suitable frame for supporting the hopper. This endplate is fastened to the body member by means of a plurality of screws 29 which threadably engage holes in the ends of the body. The heads of the screws may have a slot or recess for the reception of a screwdriver or other tool. The endplate is also provided with passages 30 and 31 which communicate with longitudinal passages 24. Fittings 32 and 33 are threaded into the respective passages and connected to pipes 34 and 35 which conduct the heat-exchange fluid or fluids away from the hopper. Similar fittings and pipes (not shown) can be connected to passage 25.

Endplate 36 is attached to the other end of the body member by means of screws 29. The lowermost screw is disposed in a hole slightly larger in diameter to permit flexing of the lip edge. This endplate has a protruding cylindrical shoulder 37 which receives the horizontal end 38 of cone-shaped sleeve 39. Surrounding the sleeve and interfitting therewith is tapered annular ring 40 having a horizontal bearing surface 41, which is journalled in a suitable bearing (not shown). The outer horizontal end 42 of this sleeve fits over a protruding cylindrical extension 43 of hubplate 44. The sleeve can be welded to the endplate ring and hubplate, or, if desired, the unit can be diecast. If desired, the endplates can be eliminated and the supply pipes directly attached to the body and the spaces at the ends of the lips closed, e.g., with a gasket or shim.

Endplate 36 is provided with two passages 45 which are extensions of channels 2 and 3. A slanting pipe 46 extends between each of the passages 45 and similar passages 47 in hubplate 44. These latter passages communicate with suitable fittings and pipes (not shown) for supplying liquid materials to channels 2 and 3. The hubplate is provided with a plurality of passages 48 for conducting a heat-exchange fluid into the annular space between sleeve 39 and pipes 46. The hubplate is also provided with a plurality of threaded holes 49 by means of which a suitable flanged fitting (not shown) can be bolted thereto.

While the tongue 6 is preferably integral with the body of the hopper, it can be machined separately and welded or screwed to the body. It can be made of three plates welded or screwed together and affixed to the body.

In operation, the hopper is placed in coating position over a suitable web to be coated. In Fig. 2 the hopper is shown above a support roller. In this arrangement a continuous sheet of film or paper 50 from a source (not shown) passes around guide rollers 51, then over support roller 52 and on to other guide rollers, etc. in a drying or treating zone or in a separate apparatus. The central axis of the hopper may be at right angles to the path of the web but preferably is at an angle of 0° to 30° from the straight section of the web leaving support roller 52, and the bottom lip preferably is $\frac{1}{16}$ to $\frac{3}{16}$ inch above the surface of the web on the coating roller, which preferably is of small diameter, for example, $\frac{1}{4}$ to $\frac{3}{4}$ inch. The web may travel at the same rate or faster than the rate of extrusion so that a drawdown of 1 to 200 times in thickness of the web occurs.

While the lip members in the above apparatus preferably are like those in the Velvel application referred to above, the invention is not limited to the use of tapered adjusting screws. For example, the adjusting screws of Knox U.S. Patent 2,686,931 can be used but the adjustment is not as fine nor as rapid with the latter.

The body member and orifice lips can be made of any strong metal or metal alloy. The body member and lips can be made of closegrain cast iron, die steel, including vanadium alloy steel, titanium, brass, bronze, etc. The sleeve and tubes can be made of die steel, stainless steel, titanium or brass or other tough material which will receive a high polish. The particular metal used will depend on the corrosive characteristics of the particular material to be extruded. The various screws, springs and collar can be made of steel, stainless steel, titanium or other suitable metal or alloy.

An important feature of the extrusion apparatus of this invention resides in the hopper lips. It has been found that, instead of having a sharp edge or a broad edge, if the edge has a blunt tip approximately 0.5- to 10-thousandths of an inch across and preferably at an angle substantially 90° from the central axis of the plane of the extrusion orifice extremely thin layers and composite two-layer films of excellent uniform quality can be obtained. The wedge-shaped portion may come to a sharp knife-edge at the orifice, or it may be blunt and 0.5- to 10-thousandths of an inch in width and, likewise, substantially at an angle 90° from the axis of a plane passing through the center of the orifice. The blunt tips should be highly polished to a finish of $\frac{1}{4}$ micro-inch or better. The walls through which the fluid to be extruded passes should be similarly polished to such a high finish.

The dual extrusion hopper of this invention is particularly useful in the vacuum coating and drying apparatus and processes described in assignee's Beck U.S. application Ser. No. 375,404 filed August 20, 1953, now Patent No. 2,815,307 and in the apparatus and processes described in assignee's Johns U.S. application Ser. No. 375,127 filed August 19, 1953, now Patent No. 2,795,522.

In the processes of this invention, two thin wide layers of viscous material are simultaneously extruded under pressure and brought into surface contact at an orifice, then applied to the surface of a continuous web moving at a speed greater than the speed of extrusion. The layers as they leave the orifices are 1 to 10 mils in thickness and when one layer is used as a sublayer or protective layer for the main layer, in general, it will be $\frac{1}{10}$ to $\frac{1}{2}$ the thickness of the former. By having the web moving at a rate of speed faster than the speed of extrusion one can obtain a drawdown of the extruded film 1 to 200 times in thickness at coating speeds greater than 150 feet per minute, particularly with viscous liquids having a viscosity of 2,000 to 100,000 centipoises. Pressures of 10 to 500 pounds per square inch can be used.

The processes of this invention are particularly useful in simultaneously extruding (a) a thin layer of an aqueous dispersion of light-sensitive silver halide in a natural or synthetic water-permeable colloid and (b) a thin protective layer of a water-permeable colloid containing an antistatic agent or (c) an antihalation layer from an aqueous dispersion or solution of an antihalation pigment or dye in a water-permeable colloid and then applying the composite layer to the surface of a moving web of film or paper. Alternatively, two different dispersions of silver halide can be extruded simultaneously and the composite layer coated onto a continuous moving web. In Fig. 2, solutions A and B are gelatin and gelatin silver halide.

In an exemplary procedure, a silver halide emulsion and an antiabrasion material were made, extruded simultaneously and coated onto a cellulose acetate film base as follows:

A dilute aqueous emulsion containing about 5% silver halide and 6.3% gelatin, by weight, was concentrated to about 50% solids content and the temperature adjusted to about 114° F. where the viscosity was about 7500 centipoises. An antiabrasion coating solution containing about 1.3% gelatin and a small amount of a hardening and antifogging agent was concentrated to about 35% solids and adjusted to about 114° F. where the viscosity was about 3000 to 3500 centipoises.

The siver halide emulsion and antiabrasion coating solution were fed from pressurized chambers into channels like 2 and 3 above, respectively, in a narrow-width dual extrusion hopper having a wedge-shaped tongue of the type covered by the claims. The flow rates were adjusted individually so that the emulsion was applied at a rate of approximately 70 mg. silver halide per square decimeter and the antiabrasion coating at about 5 to 10 mg. gelatin per square decimeter.

The hopper lips were placed above a ¾ inch diameter coating roll so that the drawdown span was ⅛ inch. The pressure in the coating chamber was held at 73 mm. Hg and an atmosphere of 100% water vapor surrounded the coating operation. The film was dried by means of infra-red heaters and had satisfactory photographic quality. The composite film had good adherence to the base and the antiabrasion layer was uniform in thickness throughout its area.

Various kinds of materials can be extruded as adjacent layers in the apparatus of this invention. Among such materials are film-forming polymers including polyethylene, polyvinyl chloride, poly(vinyl chloride co vinyl acetate), polymethyl methacrylate, polystyrene, polyethylene terephthalate; regenerated cellulose, cellulose acetate, cellulose propionate, cellulose acetate butyrate and ethyl cellulose; rubber hydrochloride, etc. These materials can be extruded in the form of an aqueous dispersion, solution in a solvent, or in molten or liquefied form. The apparatus is especially useful in coating gelatino silver halide emulsions, and other dispersions of finely divided materials in water-permeable colloids.

When the material extruded is at an elevated temperature, a heat-exchange fluid, e.g., diphenyl oxide, chlorinated biphenyl, chlorinated naphthalene and paraffin hydrocarbon oils heated to the requisite temperature is passed through the jacket surrounding the channel-shaped sleeve member. In order to prevent heat losses the body member and supply pipes can be covered with heat-insulation material. For materials which do not require temperature control, the sleeve tube and ducts or passages for the heat-exchange fluid can be eliminated.

Antiabrasion coatings, such as those used to coat X-ray sensitive silver halide emulsion layers have been used and are effective in thicknesses as low as thirty millionths of an inch. Yet, such exceedingly thin layers are difficult to extrude or apply to emulsion layers. By the dual extrusion hopper and technique of this invention, exceedingly thin antiabrasion layers can be applied to continuous webs over long periods of time.

By extruding one extremely thin silver halide emulsion layer in contact with a thicker emulsion layer, the composite film can be stretched, whereas the extremly thin layer is too fragile to be stretched or drawndown.

The apparatus of this invention has the advantage that it is simple in design but dependable. It enables one to simultaneously coat two thin layers in superposition onto a rapidly moving web. A further advantage is that it enables one to provide an extruded composite film with a base layer and an adjacent layer much thinner than can be extruded separately. Upon stretching or drawing down the extruded composite film an extremely thin adjacent layer can be obtained. Hence, the apparatus and process have the advantage that thinner layers with consequent savings in material costs result.

An important advantage of the invention is that it enables one to extrude a layer of material in the form of a film which is so thin and fragile it is incapable of being self-supporting during a drawdown coating operation, by contacting it at the point of extrusion with a layer of material capable of being drawn down during an extrusion coating operation.

The photographic films and papers obtainable in accordance with the invention, moreover, have improved characteristics. For example, an extremely thin, antiabrasion layer reduces the time required for the processing, e.g., developing, fixing, bleaching, washing, etc. of exposed photographic films and papers. Multilayer color films having extremely thin filter, light-absorbing barrier or other layers contiguous with or adjacent to a silver halide emulsion layer or layers, antihalation layers, etc. have improved resolution over films having the thicker layers obtainable by conventional coating methods.

The invention claimed is:

1. A dual extrusion hopper comprising an elongated body provided with a lengthwise wedge-shaped tongue, said body having a flat bottom on each side of said tongue at its base, an adjustable lip member on each side of said tongue and reasonably secured to the flat bottom, each lip member coacting with the adjacent slanting wall of said tongue to form a fluid extrusion passage, the outer edge of the lip member terminating in close proximity to the end of said tongue, means for adjusting the edge of the lip member toward and away from the slanting edge of said tongue, two lengthwise channels in said body communicating with a respective fluid passage and means for supplying fluid material to each respective channel.

2. A dual extrusion hopper comprising an elongated body provided with a lengthwise wedge-shaped tongue, said body having a flat bottom on each side of said tongue at its base, a U-shaped lip member on each side of said tongue having its upper arm releasably secured to the flat bottom, the surface of the central wall of said member coacting with the adjacent slanting wall of said tongue to form a fluid extrusion passage, the bottom edge of said member terminating in close proximity to the end of said tongue, the lower arm of said member being adjustable toward and away from the upper arm whereby the lip edge can be adjusted toward and away from said slanting wall, two lengthwise channels in said body each communicating with a respective passage and means for conducting viscous liquid material to the respective channels.

3. An extrusion hopper as set forth in claim 2 wherein the edge of each lip and the end of the tongue are from 0.5 to 10 mils in width and are essentially at right angles to the axis of the fluid extrusion passage.

4. A hopper as set forth in claim 2 wherein said tongue is an integral part of said body.

5. A dual extrusion hopper as set forth in claim 2 having end plates on said hopper one of which is provided with passages for conducting viscous material to the respective channels.

6. A hopper as set forth in claim 4 wherein the lower arm is divided into segments by means of lateral slots and said segments are separately adjustable.

7. A hopper as set forth in claim 4 wherein said body and lip members are provided with passages for the circulation of a heat-exchange fluid.

8. A dual extrusion hopper comprising an elongated body provided with a lengthwise wedge-shaped tongue, a separate adjustable lip member on each side of the tongue, the lip edge of said member terminating in close proximity to the end of the tongue and the wall of said member coacting with the adjacent slanting wall of the tongue to form a fluid extrusion passage, wherein the edge of each lip and the end of the tongue are from 0.5 to 10 mils in width and are essentially at right angles to the axis of the fluid extrusion passage, there being two lengthwise channels in said body, each channel communicating with a respective passage and adapted to receive viscous liquid material, and means for supplying liquid material to the respective channels.

9. An extrusion hopper as set forth in claim 8 wherein said hopper body and lip members are provided with passages for the circulation of a heat-exchange fluid.

10. The process which comprises simultaneously extruding under pressure two thin layers of different viscous materials, simultaneously bringing them into surface contact at an extrusion orifice to form a composite unsupported extruded film and coating the composite film on the surface of a web moving at a speed greater than the speed of extrusion so that there is substantial drawdown in the thickness of the composite film, and wherein one layer is so thin that it is not self-supporting and the other is of such thickness that it is self-supporting during drawdown.

11. A process as set forth in claim 10 wherein one layer of viscous liquid is an aqueous dispersion of silver halide in a water-permeable colloid and the other layer is an aqueous dispersion of a water-permeable colloid.

References Cited in the file of this patent

UNITED STATES PATENTS

| | | |
|---|---|---|
| 1,885,747 | Maurer | Nov. 1, 1932 |
| 1,924,010 | Wickham | Aug. 22, 1933 |
| 1,990,078 | Kinsella et al. | Feb. 5, 1935 |
| 2,052,695 | Chiverton | Sept. 1, 1936 |
| 2,569,373 | Fay | Sept. 25, 1951 |
| 2,727,276 | Nelson | Dec. 20, 1955 |

FOREIGN PATENTS

| | | |
|---|---|---|
| 266,465 | Italy | July 29, 1929 |
| 466,319 | Italy | Oct. 26, 1951 |